`US007200157B1`

United States Patent
Hessler et al.

(10) Patent No.: US 7,200,157 B1
(45) Date of Patent: Apr. 3, 2007

(54) DETECTION AND COMPENSATION OF INGRESSING FRAME OFFSET DISCONTINUITIES FOR TANDEM CONNECTION TRAILS

(75) Inventors: Peter Hessler, Erlangen (DE); Manfred Alois Loeffler, Igensdorf (DE); Jurgen Leonhard Milisterfer, Rosstal (DE); Maarten Petrus Joseph Vissers, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/937,367

(22) PCT Filed: Mar. 28, 2000

(86) PCT No.: PCT/IB00/00419

§ 371 (c)(1),
(2), (4) Date: Sep. 21, 2001

(87) PCT Pub. No.: WO00/59144

PCT Pub. Date: Oct. 5, 2000

(30) Foreign Application Priority Data

Mar. 29, 1999 (EP) ................................... 99106363

(51) Int. Cl.
 *H04J 3/06* (2006.01)
(52) U.S. Cl. ....................... 370/509; 370/516; 370/907
(58) Field of Classification Search ..................... None
See application file for complete search history.

(56) References Cited

U.S. PATENT DOCUMENTS

| | | | | |
|---|---|---|---|---|
| 5,128,939 A | * | 7/1992 | Takatori et al. ............. | 370/509 |
| 5,349,581 A | * | 9/1994 | Kaneko ....................... | 370/505 |
| 5,455,832 A | * | 10/1995 | Bowmaster .................. | 714/712 |
| 5,539,750 A | * | 7/1996 | Kivi-Mannila et al. ..... | 370/506 |
| 5,644,567 A | | 7/1997 | Ikeda .......................... | 370/225 |
| 5,706,280 A | * | 1/1998 | Kosugi et al. ............... | 370/244 |
| 5,777,998 A | * | 7/1998 | Traverso et al. ............ | 370/509 |
| 6,195,330 B1 | * | 2/2001 | Sawey et al. ................ | 370/220 |
| 6,545,980 B1 | * | 4/2003 | Dive et al. .................. | 370/242 |

FOREIGN PATENT DOCUMENTS

| | | |
|---|---|---|
| CH | XP-02112911 | 6/1997 |
| FR | XP002112909 | 11/1998 |
| FR | XP002112910 | 11/1998 |
| WO | WO 92/02999 | 2/1992 |

* cited by examiner

*Primary Examiner*—Chau Nguyen
*Assistant Examiner*—Anthony Sol
(74) *Attorney, Agent, or Firm*—Eugene J. Rosenthal

(57) ABSTRACT

A method and system are provided for the detection and compensation of frame offset discontinuities for tandem connection trails in general and especially to frame offset discontinuities occurring at the entrance of a network element in a Synchronous Digital Hierarchy (SDH) and Synchronous Optical Network (SONET) system. More specifically, a method of transmitting data in a synchronous hierarchic network system comprising at least a path segment between a first network element and at least a second network element on which tandem connection monitoring (TC) method is established for monitoring transmission of information over the path segment is characterised by detection of frame offset discontinuities at the first network element on the basis of the detection of an alteration of the pointer value.

10 Claims, 6 Drawing Sheets

(old value > new value) AND
(old value - new value) < max./2

(old value < new value) AND
(new value - old value) < max./2

(old value > new value) AND
(old value - new value) >= max./2

(old value < new value) AND
(new value - old value) >= max./2

DETECTION AND COMPENSATION OF INGRESSING FRAME OFFSET DISCONTINUITIES FOR TANDEM CONNECTION TRAILS

TECHNICAL FIELD

The invention relates to the detection and compensation of frame offset discontinuities for tandem connection trails in general and especially to frame offset discontinuities occurring at the entrance of a network element in a Synchronous Digital Hierarchy (SDH) and Synchronous Optical Network (SONET) system.

BACKGROUND OF THE INVENTION

The problem addressed with this invention typically arises in Synchronous Digital Hierarchy (SDH) and Synchronous Optical Network (SONET) systems in the case Of switching of parts of a network path due to a failure condition or in case of a faulty or defect part of the network path. For a deeper understanding of SDH and SONET systems, reference is made to "Understanding of SONET/SDH", ISBN 0-9650448-2-3, Andan Publisher, New Jersey. In the beforementioned network systems a tandem connection is intended to provide an administrative monitoring domain which is operating independent of the end to end path. Errors and faults outside the tandem connection should not be noticed in the tandem connection performance monitoring and fault management itself. However, the existing tandem connection equipment specifications in ETSI EN300 417-4-1 and ITU-T G.783 do not support this independence under all conditions especially if frame offset discontinuities occur. A frame offset discontinuity is a change of the pointer's value which defines the flexible start position of the Virtual Container within the SDH frame or an overflow or underflow of the elastic store used to adapt the ingressing data stream to the system frequency. Pointer justifications (i.e. increment and decrement operations) also change the value of the pointer but they are not frame offset discontinuities in the sense of or according to the definition as used in connection with this invention.

On every incoming frame offset discontinuity of the Virtual Container (VC) within the SDH frame, the tandem connection performance monitoring system will detect errored blocks and therefore declare one or two errored seconds (during which data are declared to be faulty or errored). Also Tandem Connection (TC) alarms may be raised.

These undesirable effects are caused by the fact that Pointer Processors (PP) are used in the network elements for the adaptation of the frequency of the incoming signal to the internal frequency of the network element and for accessing the virtual containers.

The transport of frame offset discontinuities through the network (series of pointer processors) will be fast (few bytes delay per Pointer Processor) in the virtual container signal, and much slower in the Administrative Unit (AU) or Tributary Unit (TU) (0 to 1 frame delay per pointer processor). For a certain amount of time the frame start indication, i.e. the pointer at the tandem connection sink node is not aligned with the actual phase of the virtual container. Information will be read from the wrong byte positions during this period of misalignment. This effect increases with the number of pointer processors in the chain.

The problem for tandem connection trails is introduced by the fact that there is no separate layer to transport the tandem connection information and that the path (virtual container) layer is used instead. Therefore interruptions on the path (virtual container) layer also influence the tandem connection layer.

SUMMARY OF THE INVENTION

According to the principles of the invention, the influence of frame offset discontinuities occurring at the beginning of a Tandem Connection Trail in a Synchronous Digital Hierarchy (SDH) or in a Synchronous Optical Network (SONET) System is reduced.

More specifically, frame offset discontinuities are detected and relayed to a network management system where this information is further utilized to initiate predefined process steps.

In one illustrative embodiment of the invention, the signaled information is processed and stored as a kind of transmission quality protocol for a segment of the respective network path provided to a customer. As a consequence thereof, a network provider is enabled to show that the distortion or the fault condition was not caused within the providers network path segment but was received at the entrance or input of the path segment.

If the discontinuity condition detected at network element A is transmitted to network element B, which process also is termed throughout the description of the invention as "frame offset discontinuity inband signaling", then a provider may collect this information for establishing a transmission quality report and filter out faulty or distorted periods of transmission. In addition, storing of the quality data will reveal at any later point of time that, even if certain incoming data were faulty, these data were transmitted essentially without additional distortions along the providers network path segment.

In another illustrative embodiment, after detection of a discontinuity condition, transmitted pointer values are altered stepwise towards a new valid pointer value (i.e. a valid value after occurrence of the offset discontinuity). Due to the stepwise alteration an uninterrupted or contiguous adaptation from an early undistorted transmission condition to a new undisturbed transmission condition for the TC-relevant data is obtained for the downstream network elements. This adaptation is also named a "smooth" pointer adaptation in the course of the further detailed description.

Advantageously, faster smooth adaptation can be obtained if the distance between the last valid pointer value before and the new valid pointer value after the detected discontinuity condition is used to evaluate and select the shortest difference for the stepwise adaptation of the pointer values.

In another illustrative embodiment of the invention, the pointer values of a pointer, as received in advance of the discontinuity condition, are transmitted during the time interval used to evaluate the necessary pointer actions (in case of smooth pointer adaptation) or to signal the discontinuity (in case of inband signalling) to avoid transmitting of faulty TC-relevant data during this time interval.

If, after detection and signalling of the discontinuity condition, the tandem connection monitoring (TC) system suspends counting and evaluating of errors and failures for a predefined interval of time and this interval of time is chosen to be sufficient for covering the period of time necessary for compensating the discontinuity condition, suspending is of no negative influence but beneficial as it is not desired to report any TC failures and errors caused by the ingressing discontinuity.

Moreover, in case that after detection of the discontinuity condition, collection or reporting of errors and failures is interrupted for a predefined interval of time and this interval of time is chosen to be long enough for covering the period of time necessary for compensating the discontinuity condition, it is ascertained that a provider receives only undistorted TC-relevant data. It is assumed that the necessary interval of time during which the data transmission fails is within the allowed range for the relevant network applications.

BRIEF DESCRIPTION OF THE DRAWINGS

The invention is described in more detail in connection with the appended drawings in which.

DETAILED DESCRIPTION

Language, terminology and definitions are used throughout the description and in the claims in accordance to the respective international and national standard notation, i.e. unless other definitions were made in view of specific terms.

Definitions and Glossary

In addition to definitions given in the introductory portion of the description, a synchronous hierarchic system according to the invention is an SDH or SONET system or a system including path sections between network elements NE including the essential features of SDH or SONET systems.

The term "frame offset discontinuity" in connection with the invention is intended to cover an alteration of the pointer value other than an increment or decrement operation that is introduced by the network system and an ingressing discontinuity is meant to cover a discontinuity received by or entering a network element NE.

Even if in the following description of the most preferred embodiments only an SDH application is described, the essential principle is also applicable to SONET systems.

Figure 1:
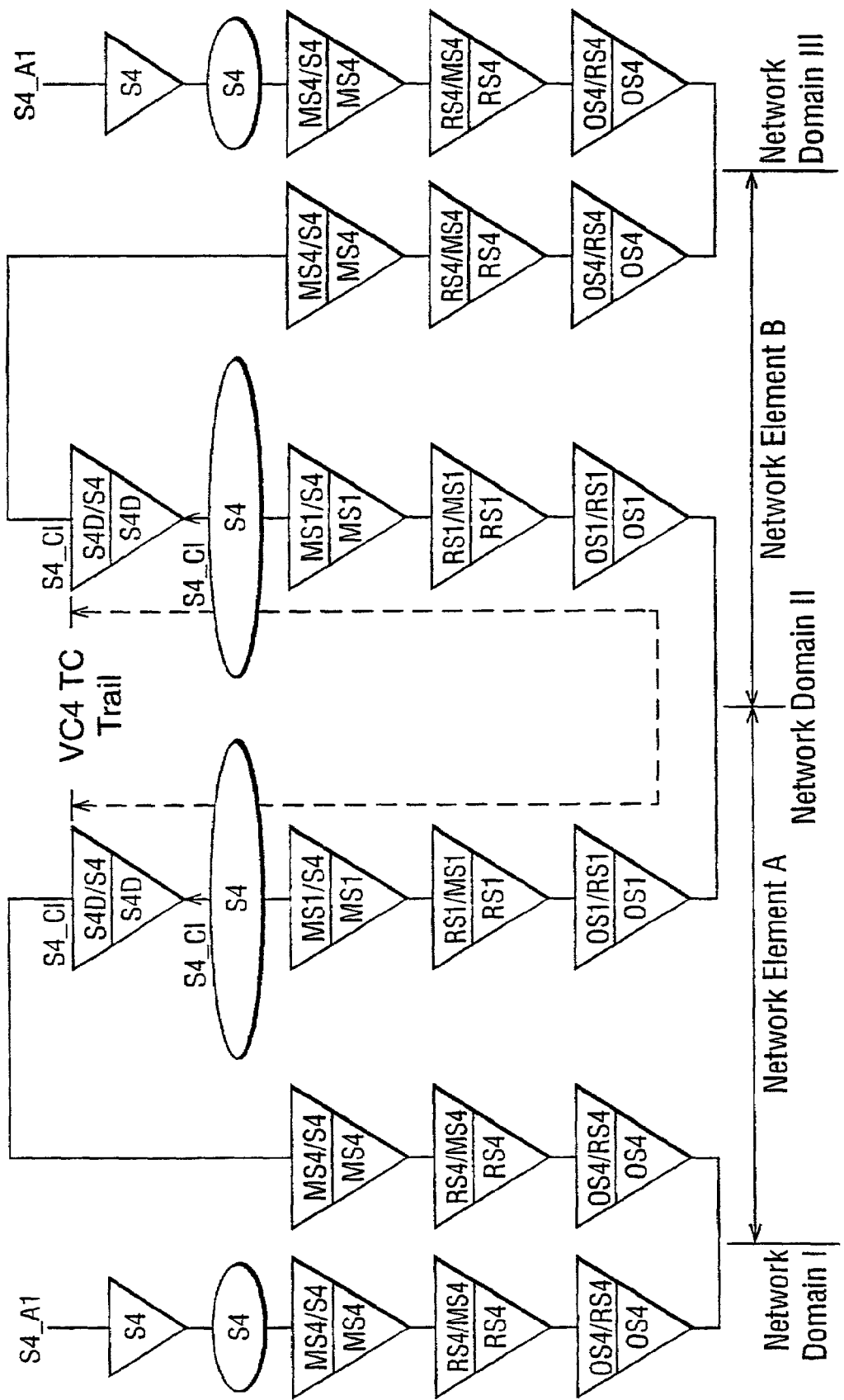
FIG. 1 shows the functional model for a VC-4 path from Network Domain I via Network Domain II to Network Domain III with an embedded VC-4 tandem connection trail in Network Domain II between Network Elements (NE) A and B.

FIG. 1 shows the functional model for a VC-4 path from Network Domain I via Network Domain II to Network Domain III with an embedded VC-4 tandem connection trail in Network Domain II between Network Elements (NE) A and B. The network elements (NEs) A and B are connected via an optical STM-1 link and both NEs are connected to Network Domain I and III via an optical STM-4 link.

The standards define that in NE A a pointer interpreter is in the adaptation sink function MS4/S4 and a pointer generator in the adaptation source function MS1/S4 with the Tandem Connection Adaptation Source S4D/S4 function and the TC TT Source S4D function between. For the reverse direction there is a pointer interpreter in the adaptation sink function MS1/S4 and a pointer generator in the adaptation source function MS4/S4 with the TC Adaptation Sink function S4D/S4 and the TC TT Sink function S4D between. In principle the same applies for NE B. The following mechanism is used at the TC Adaptation Source function on the transition into an SSF condition (holdover mode): The adaptation sink function MS4/S4 receives a signal with incorrect pointer values. It will count the number for some frames (3 if AIS in pointer, 8 if invalid pointer). During this period the frame start signal CI FS is maintained and the SSF indication signal CI SSF is inactive (=FALSE). On detection of a defect (dAIS or dLOP), CL_FS becomes invalid and CI_SSF becomes active (=TRUE). Furthermore, all-1's is inserted into the VC-4 signal.

The TC Adaptation Source function S4D/S4 detecting the change in CI FS and CI SSF, enters "holdover" state in its Frame Start circuit, and continues to generate the frame start signal AI FS at the same position as before. It will also activate the signal fail indication signal AI SF.

The TC Trail Termination Source function S4D will continue to receive a valid AI FS signal at the same position as before. It will also receive an active AI SF signal and will insert the IncAIS Code (N1 [1–4]=1110) into the signal. Signalling of IncAIS must not start before the mismatch between B3 and the BIP-8 calculated over the previous frame (caused by the start of the all-ones-insertion) is cleared, i.e. not before a complete frame has been overwritten with all-ones. This is not explicitly described in the standards, but is essential to prevent the detection of TC bit errors at the far end. Therefore this procedure is considered as state of the art and is not further mentioned in the following text. The IncAIS code point in the IEC (=Incoming Error Code) field is interpreted as zero errors at the far end, which is correct for the transmission of VC-AIS. During the defect detection time in the adaptation sink function MS4/S4, mismatches between calculated BIP-8 and B3 will be detected as there is an access to a random B3 byte position. They are correctly encoded into the IEC field. As such, the transition will not result in the detection of any errors in the TC. The adaptation source function MS1/S4 receives a continuous CI FS and will not change its pointer value.

In principle an arbitrary frame start discontinuity can also be detected as a change of the frame start signal CI FS entering the TC Adaptation Source function S4D/S4.

However many implementations do not follow the standards with respect to the locations of the pointer interpreter and the pointer generator, but have a combined pointer interpreter/generator in the adaptation sink function MSx/S4 and no further pointer handling in the adaptation source function MSx/S4. Therefore a frame offset discontinuity entering the network element with the TC Adaptation Source function is not always accompanied by a new data flag (NDF) in the pointer. Following this kind of implementation also means that the TC Adaptation Source function S4D/S4 must have the functionality of pointer generation in case of SSF (holdover mode).

Scenarios which cause frame offset discontinuities in the network in front of the TC Adaptation Source are listed below. It is also shown which resulting pointer transitions are input to the NE with the TC Adaptation Source function:

Recovery from Server Signal Fail (SSF) condition (Loss of Pointer (LOP)/AU/TU-AIS) as a result of the repair of a fault or of a protection switch (initiated by a SSF condition)

In this case, the pointer transitions are:
SSF−>New Data Flag (NDF)−>Norm
SSF−>Norm Establishment of a different path as a result of a cross-connect change in front of the tandem connection trail. In this case, the pointer transitions are (this also includes signal changes where typically an Unequipped Signal is used):
Norm1−>NDF−>Norm2
Norm1−>Norm2

Change of phase alignment of byte-synchronously mapped plesiochronous signals. (An example is described in EN 300 417-4-1, Annex C.). In this case, the pointer transitions are:
Norm1−>NDF−>Norm2

Protection switches caused by external commands (manual or forced switch), by revertive operation mode or by condition changes which do not affect the pointer (e.g. Signal Degrade). In this case, the pointer transitions are:
Norm1−>NDF−>Norm2
Norm1−>Norm2

The transition from a valid signal into SSF is also a frame offset discontinuity. As this case is considered already in the standards ("Holdover mode for the TC Adaptation Source function") it is not an issue of the further discussion.

To solve the problem, frame offset discontinuities need to be detected at the TC Adaptation Source function. After detection, either an error free tandem connection signal can be inserted at the TC Trail Termination Source function or the frame offset discontinuity can be communicated to the TC Trail Termination Sink function and TC Non-intrusive Trail Termination Sink function to suspend the performance monitoring and the evaluation of the tandem connection defects there for an appropriate period of time.

Frame Offset Discontinuity Detection

An incoming frame offset discontinuity occurs if a pointer value is received different from the previous one with NDF set or if three consecutive new, valid and identical pointer values are received without NDF set. Normal stuffing actions are not frame offset discontinuities.

Therefore the detection of the frame offset discontinuity can be achieved by searching for both:
the New Data Flag enabled in the incoming pointer; and
three times detection of a new pointer value without NDF (New Pointer Value (NPV)).

The pointer transitions that need to be detected are shown in EN 300 417-1-1, Annex B. FIG. B1 in this annex shows the pointer interpretation states. All states marked with "NDF_enable" or "3*new_point" are frame offset discontinuities as described above.

Procedures to Compensate the Effects of Ingressing Frame Offset Discontinuities

To improve the behaviour of tandem connection trails with respect to ingressing frame offset discontinuities it is intended according to the invention to:
suppress the propagation of frame offset discontinuities into the tandem connection trail by converting the frame offset discontinuities to series of pointer justifications;
signal the incoming frame offset discontinuity to the TC Trail Termination (TC TT) Sink function and TC Non-intrusive Trail Termination (TC NIM TT) Sink functions and suspend counting and reporting of errors and defects there for a certain period of time; and
signal the detected frame offset discontinuity to the network element management and network management system for further processing. (The reporting is done towards the Equipment Management Function (EMF) and then e.g. via the Q-interface to the network element management system.)

Smooth Pointer Adaptation

The frame offset discontinuity within the tandem connection trail can be completely suppressed by changing the pointer generation in the Network Element containing the TC Adaptation Source. The idea is to "smooth" the frame offset discontinuity by converting it to a series of consequent pointer actions (increment or decrement) instead of following the jump immediately.

In a first option the distance of the old and new pointer is not taken into account to choose the shortest way of adaptation, but either a sequence of positive or negative justifications is used to go from the last valid pointer value to the new pointer value.

In a second option in order to keep the recovery time for this method as short as possible, the distance between the last valid pointer value and the new valid value after the frame offset discontinuity shall be evaluated. Depending on the distance, either positive or negative justifications shall be used to go from the old pointer value to the new pointer value. During the distance evaluation the last valid pointer value shall be inserted (holdover mode).

As a further enhancement (third option) the drift direction of the incoming pointer may be evaluated and used for the decision which stuffing direction should be used. This enhancement can be used if the distance for positive and negative justifications is nearly equal.

After the stuffing direction is decided, the pointer generator at the Tandem Connection Monitoring (TCM) source starts inserting pointer justifications. The justification rate shall be as high as feasible but low enough so that it can be propagated through the tandem connection trail without introducing pointer errors.

As soon as the pointer insertion reaches the same pointer value as the incoming signal, a check of the inserted pointer versus the incoming pointer sequence is necessary. If the inserted pointer value is at least three times identical to the incoming pointer, the insertion can be switched off. This check is necessary to prevent the creation of invalid pointer sequences (only every four frames pointer justifications are allowed).

As an option to reduce induced errors behind the tandem connection trail, Incoming AIS (IncAIS) may be signaled via N1/N2 and VC-AIS may be inserted in the path while the smooth pointer adaptation is active. For example such errors would occur if a desynchroniser process accesses random byte positions to detect stuffing information. This could put it beyond its phase adjustment limits.

According to this method, the frame offset discontinuity must not be propagated into the tandem connection trail during the detection period of the frame offset discontinuity (i.e. until the smooth pointer adaptation starts).

A major advantage of this method is the fact that it requires only modifications at the TC Adaptation Source. This would allow interworking with all equipment containing a standard-compliant TC TT Sink function or TC NIM TT Sink function.

Frame Offset Discontinuity Inband Signalling

The idea of the method of frame offset discontinuity (FOD) inband signalling is to delay the incoming frame offset discontinuity by introducing a holdover mode by a few virtual container frames so that the appearance of a frame offset discontinuity can be communicated within the tandem connection trail from the TC Adaptation Source function to the TC TT Sink function and intermediate TC NIM TT Sink functions.

After detection of the frame offset discontinuity, the pointer generation of the Network Element containing the tandem connection source function shall continue to transmit the pointer value used before the frame offset discontinuity (holdover mode). This is similar to the method used for the transition into SSF.

During the holdover time, a signalling code is inserted in the Tandem Connection Path Overhead (i.e. N1 for VC-4/3 and contiguous concatenated VC-4-Xc TC, N2 for VC-2/12/11 TC). This code must be selected such that it is not used during normal tandem connection operation and it should be selected such that the operation of Performance Monitoring and Fault Management is not disturbed. For VC-4/3 and VC-4-Xc TC, a correction of the B3 byte may be necessary, depending on the inserted signalling code.

To keep the holdover phase as short as possible it is recommended to use N1/N2 bits repeated every VC-frame (i.e. bits within the 76 frames tandem connection multiframe should not be used).

The signalling sequence shall be such that a safe transmission even with up to one bit error in the sequence is possible. After the frame offset discontinuity is signaled, the frame offset discontinuity can be propagated into the tandem connection trail.

An alternative option when doing this is not to immediately switch over to the new pointer value after the end of the signalling sequence, but instead to take care that a correct sequence of pointer values is maintained.

At the TC TT Sink function, the frame offset discontinuity code shall be detected out of the N1/N2 bytes. The detection shall tolerate at least one bit error in the signalling code.

After reception of the frame offset discontinuity code, the signal can be assumed as defective for a fixed period of time. During this period, the TC TT Sink function and TC NIM TT Sink function shall stop the accumulation of errors and suspend the usage of tandem connection defects for fault processing and defect second detection. Furthermore, the TC NIM TT Sink function shall suspend the usage of tandem connection defects for sub network connection protection (SNCP) switching.

For this method, the frame offset discontinuity must not be propagated into the TC trail until it is completely signaled.

Frame Offset Discontinuity Reporting

The reporting of frame offset discontinuities can be done directly at the TC Adaptation Source function or (with FOD inband signalling as described above) at the TC TT Sink function or TC NIM TT Sink function.

The reported frame offset discontinuities can be used for event logging or performance monitoring.

Application Example

In the TCM application, the described compensation modes can be activated and used separately per tandem connection trail. So by means of the network element or network management system each tandem connection trail can be adapted to the needs of the planned network application. If the compensation modes are disabled, the TCM function behaves as required by the current standards. The third mechanism, to report the detected incoming frame offset discontinuities, is implemented in parallel.

In the application example the functionality of the TC Adaptation Source function and of the TC TT Source function is implemented by the TCM Source function block, that of the TC Adaptation Sink function and of the TC TT Sink function by the TCM Sink function block and that of the TC NIM TT Sink function by that of the TC NIM function block.

Frame Offset Discontinuity Detection

This part is common for all proposed mechanisms. The goal of the frame offset discontinuity detection is to detect all incoming frame offset discontinuities. As stated above, the pointer transitions that need to be detected are shown in EN 300 417-1-1, Annex B. FIG. B1 in this annex shows the pointer interpretation states. All states marked with "NDF_enable" or "3*new_point" are frame offset discontinuities.

Figure 2:
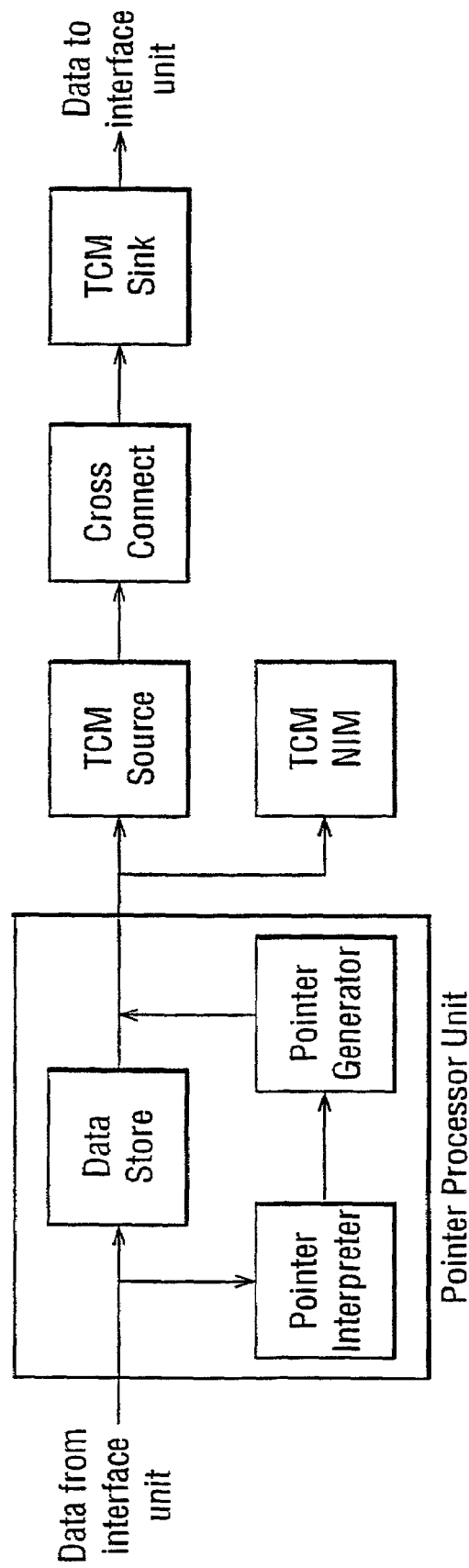
FIG. 2 details a High-Level View of an exemplary SDH System Architecture.

In one exemplary SDH system manufactured by Lucent Technologies, a pointer processing unit is located in front of the TCM Source function block. The described application relies on the fact that the frame offset discontinuities are detected in the pointer processor unit so that only valid pointers or AU/TU-AIS conditions arrive at the TCM Source function block. The high level view of this exemplary system architecture is given by FIG. 2.

The table below shows how incoming frame offset discontinuities are converted by the pointer processor unit in front of the TCM Source function block.

| Input to PP Unit: Transition | Input to PP Unit: Condition | Input to TCM Source function block: Pointer sequence generated at PP Unit |
|---|---|---|
| INC -> NDF | NDF_enable set | Norm -> NDF_enable -> Norm |
| DEC -> NDF | NDF_enable set | Norm -> NDF_enable -> Norm |
| NDF -> NDF | NDF_enable set | Norm -> NDF_enable -> Norm |
| Norm -> NDF | NDF_enable set | Norm -> NDF_enable -> Norm |
| AIS -> NDF | NDF_enable set | AU/TU-AIS -> NDF_enable -> Norm |
| Norm -> Norm | 3*new_point | Norm -> NDF_enable -> Norm |
| INC -> Norm | 3*new_point | Norm -> NDF_enable -> Norm |
| DEC -> Norm | 3*new_point | Norm -> NDF_enable -> Norm |
| NDF -> Norm | 3*new_point | Norm -> NDF_enable -> Norm |
| LOP -> Norm | 3*new_point | AU/TU-AIS -> NDF_enable -> Norm |
| AIS -> Norm | 3*new_point | AU/TU-AIS -> NDF_enable -> Norm |

Looking at the generated pointer sequences in the table above it can be seen that all incoming frame offset discontinuities arrive at the TCM Source function block as a pointer with the NDF-enable set. However, there may be some older equipment which doesn't generate NDF while going from AU/TU-AIS to Norm.

Therefore the conditions that need to be detected at the TCM Source function block are:

NDF_enable

Transition AIS–>Non-AIS

For this detection, it is sufficient to check the H1/V1 byte for the following conditions:

NDF_enable, i.e. NDF-bits in H1/V1 set to "1001". It is not necessary to check for the other valid NDF_enable values, the ss-bit match and the pointer offset value because the transmission from pointer processor unit to TCM source function is system-internal and can be assumed as error-free; and Transition from an "all-ones" in H1/V1 to any other value to detect the AU/TU-AIS to Non-AIS transition in case of missing NDF (interworking with old pointer processor units which might not generate an NDF.

The two conditions above are detected by a simple one-time pattern match check of the incoming H1/V1 byte per virtual container at the TCM Source function block. The detected frame offset discontinuities are made available for reporting towards the network element management.

Smooth Pointer Adaptation

Figure 3:
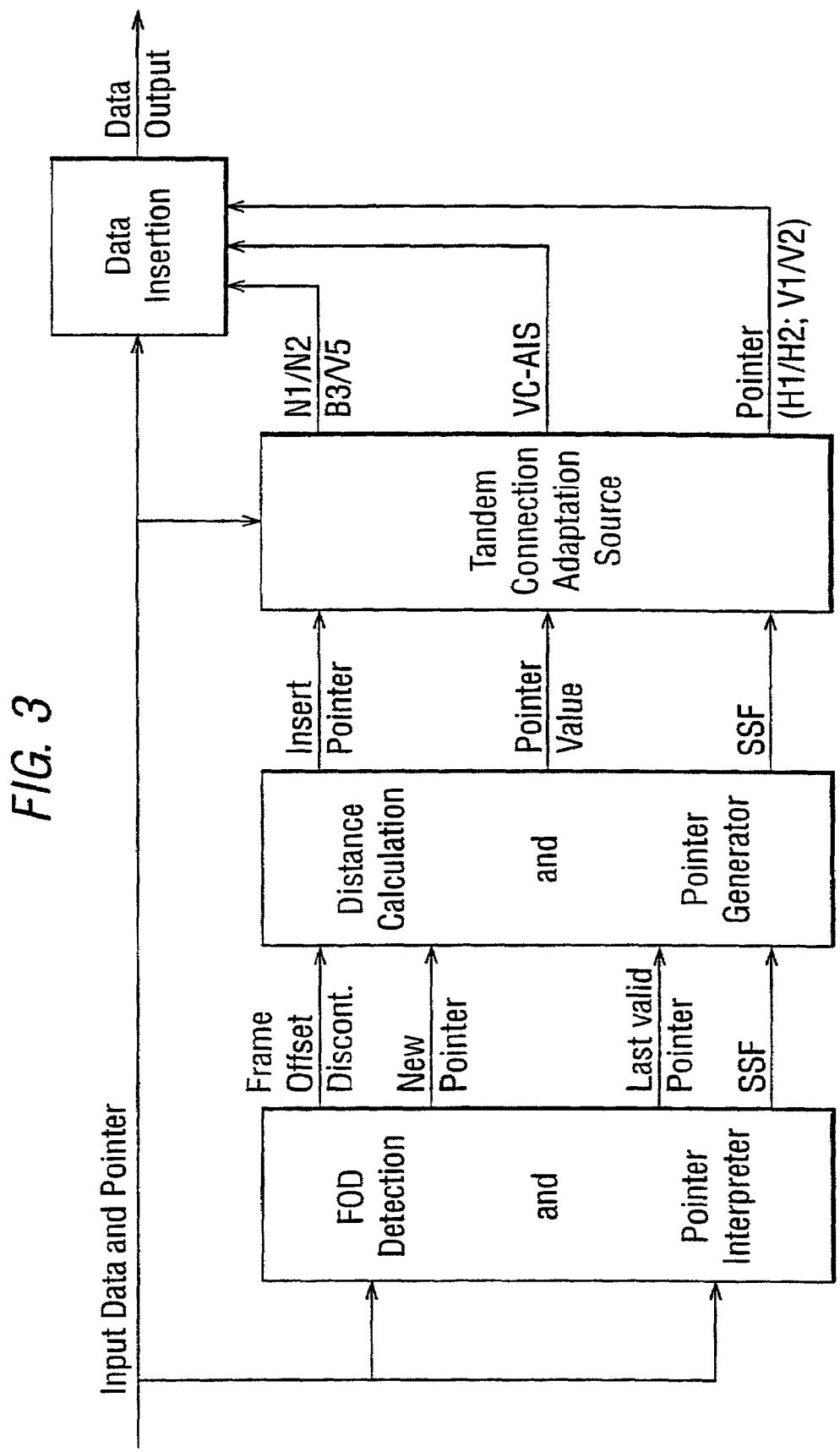
FIG. 3 shows a block overview of a smooth pointer adaptation at the TCM Source Function Block.
Figure 4A:
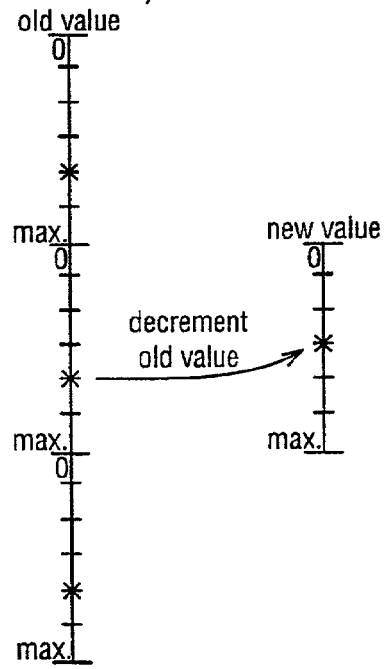
FIG. 4 explains different cases for a pointer distance calculation for the smooth pointer adaptation mode.
Figure 4B:
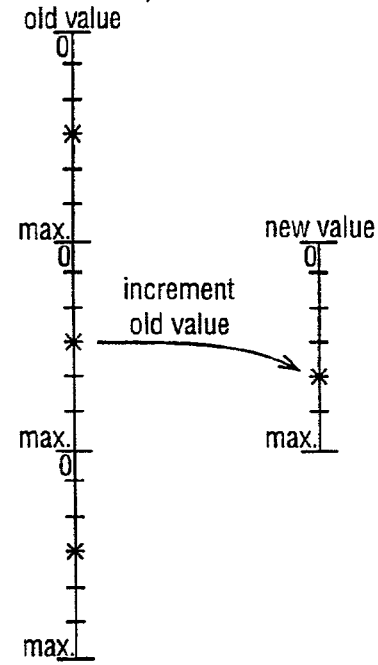
Figure 4C:
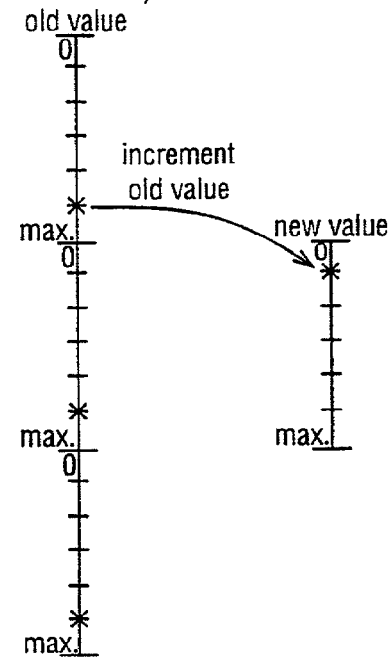
Figure 4D:
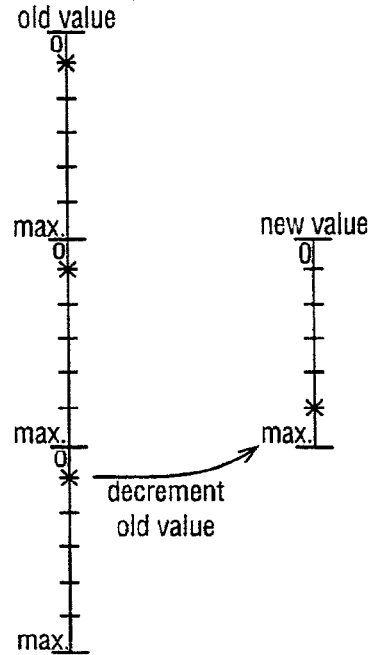

For the smooth pointer adaptation a pointer interpreter and pointer generator with only limited functionality (regarded to what's required in the standards) is implemented. FIG. 3 shows a block diagram of the smooth pointer adaptation mechanism at the TCM Source function block.

The pointer interpreter at the TC Adaptation Source function always stores the last valid pointer value. This can be either the last pointer value before entering SSF (if the TC Trail Adaptation Source goes in holdover mode) or the pointer value contained in the AU/TU frame before the frame offset discontinuity. During the smooth pointer adaptation phase, the stored received pointer value is replaced by the last inserted pointer value. At the occurrence of a frame offset discontinuity, this pointer value is communicated to the TC Adaptation part of TCM Source function block where it is inserted into the outgoing pointer.

As soon as a new valid pointer is available (i.e. directly after the frame offset discontinuity), the pointer distance between the new valid pointer and the stored pointer value is measured to decide the stuffing direction for the inserted pointer.

FIG. 4 shows how the pointer distance is calculated. Four cases need to be considered:

a. (old value>new value) AND (old value–new value) <max./2–> use decrement operation;
b. (old value<new value) AND (new value–old value) <max./2–> use increment operation;
c. (old value>new value) AND (old value–new value) >=max./2–> use increment operation; and
d. (old value<new value) AND (new value–old value) >=max./2–>use decrement operation.

The maximum value (max.) is as follows: 782 for VC-4/VC-4-Xc, 764 for VC-3, 427 for VC-2, 139 for VC-12 and 103 for VC-11.

The pointer generation and insertion in the TC Adaptation part of the TCM Source function block inserts stuffing actions every 8th virtual container frame. Using this stuffing rate (and assuming that the incoming pointer value does not drift), the time to reach the incoming pointer is:

392 milliseconds for VC-4/VC-4-Xc
383 milliseconds for VC-3
856 milliseconds for VC-2
280 milliseconds for VC-12
208 milliseconds for VC-11

This time may be lengthened by up to 10% if the incoming pointer value drifts with the maximum offset defined for SDH signals.

If a further frame offset discontinuity occurs while the TC Adaptation part of the TCM Source function block is in the smooth pointer adaptation mode, the distance calculation is retriggered. In this case, the distance between the currently inserted pointer and the new pointer, after the frame offset discontinuity, is calculated and the adaptation is restarted.

During the smooth pointer adaptation period the virtual container is overwritten by an all-ones signal (VC-AIS) in the Adaptation part of the TCM Source function block and Incoming AIS is signaled via N1/N2.

If a SSF condition occurs while the smooth pointer adaptation mode is active, the holdover mode is entered using the previously inserted pointer value.

As soon as the inserted pointer value is equal to the incoming one, a pointer check mode is entered as follows:

If the inserted pointer is the same as the incoming one for three consecutive times, the insertion is switched off and the incoming pointer is directly passed to the output;

If a new pointer value is detected at the input (most likely an increment/decrement operation), the smooth pointer adaptation mode is entered again to follow the change of the pointer value.

With the end of the smooth pointer adaptation the all-ones insertion for the virtual container and the signalling of Incoming AIS via N1/N2 is stopped.

Frame Offset Discontinuity Inband Signalling Mechanism

Figure 5:
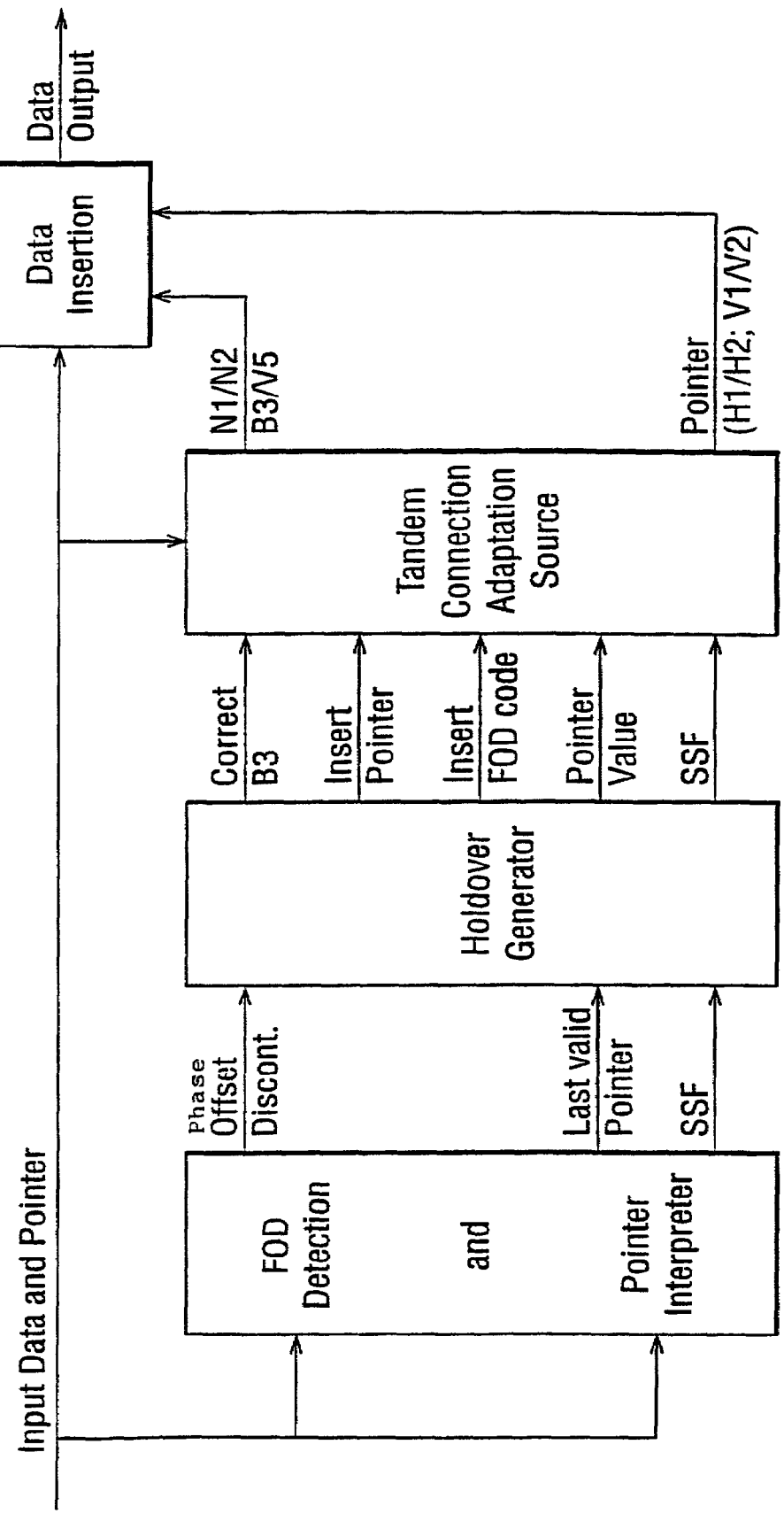
FIG. 5 shows a block overview of frame offset discontinuity inband signalling at the TCM Source Function Block.
Figure 6:
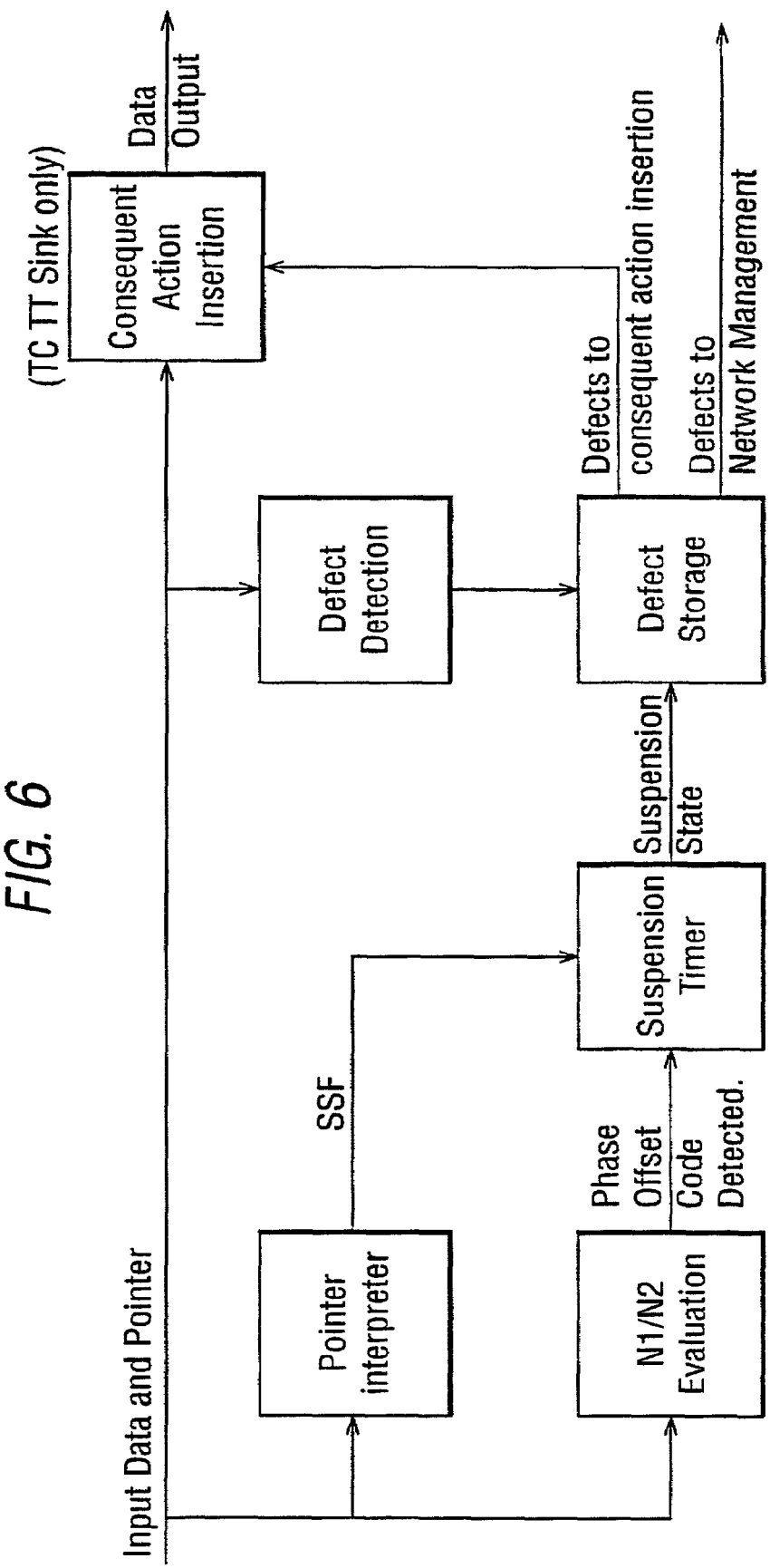
FIG. 6 shows a block overview of frame offset discontinuity signalling at the TCM Sink and TCM NIM function block.

Block diagrams for the Frame Offset Discontinuity (FOD) inband signalling mechanism are given for the TCM Source function block in FIG. 5 and for the TCM Sink and TCM NIM function block in FIG. 6.

Operation of the TCM Source Function Block for VC-4, VC-4-Xc and VC-3 TC Trails

After the detection of the frame offset discontinuity, the frame offset discontinuity is signaled into the TC trail by setting bits b1 . . . b4 of byte N1 (IEC=Incoming Error Count) to 1101 for 6 consecutive virtual container frames. This value is normally not used and according to the standard (EN 300 417-4-1) it is interpreted in the TC NIM TT Sink function and in the TC TT Sink function as 0 BIP violations. During the signalling period, the last valid received pointer is inserted (holdover mode). The period of signalling lasts 6*125 us. In order not to misinterpret the incoming BIP-8 violations of the path segment in front of the TC trail as bit errors of the tandem connection trail itself, the BIP-8 value calculated over the previous ingressing frame is inserted at the position of the incoming B3 byte. After this correction the normal processing of the TC TT Source function (i.e. N1 modification and B3 compensation, see EN 300 417-4-1) is carried out. To replace the incoming B3 byte by the BIP-8 value calculated by the TC TT Source part of the TCM Source function block is not a problem as due to the frame offset discontinuity the byte accessed as "B3" is more than likely not the BIP-8 value originally inserted at the begin of the path. After the end of the signalling phase the holdover mode for the pointer is left and the ingressing pointer is passed through transparently.

Operation of the TCM Sink and TCM NIM Function Block for VC-4, VC-4-Xc, and VC-3 TC Trails The frame offset discontinuity detection process at the sink function monitors bits b1 . . . b4 of byte N1. If the reserved value 1101 is received in 3 consecutive virtual container frames the TCM Sink and TCM NIM function blocks will enter the "frame offset discontinuity suspension state". If there is no retriggering the suspension state will be left with the next but one 1-second tick. So the duration of the suspension state is at least one second. (A central one second tick is available in the system which e.g. is also used for performance monitoring purpose). However, if a SSF condition is detected during the FOD suspension state, the FOD suspension state will immediately be left and normal operation will be re-established. The transition into the FOD suspension state is reported towards the network element management system.

Operation of the TCM Source Function Block for VC-2, VC-12, VC-11 TC Trails

After the detection of the frame offset discontinuity, the frame offset discontinuity is signaled into the tandem connection trail by inserting the alternating pattern 01, 10 into bits b3, b4 of byte N2 for 7 consecutive VC-2/VC-12/VC-11 frames. Bit b3 is normally fixed to 1, and b4 indicates Incoming AIS. During the signalling period, the last valid received pointer is inserted (holdover mode). The period of signalling lasts 7*500 us. After the end of the signalling phase the holdover mode for the pointer is left and the ingressing pointer is passed through transparently.

Operation of the TCM Sink and TCM NIM Function Block for VC-2, VC-12, VC-11 TC Trails The frame offset discontinuity detection process at the sink function monitors bits b3, b4 of byte N2. If the reserved pattern sequence 01, 10, 01 is received (this will take 3 VC frames) the TCM Sink and TCM NIM function block will enter the "frame offset discontinuity suspension state". If there is no retriggering the suspension state will be left with the next but one 1-second tick. So the duration of the suspension state is at least one second. (A central one second tick is available in the system which e.g. is also used for performance monitoring purpose). However, if an SSF is detected during the FOD suspension state, the FOD suspension state will immediately be left and normal operation will be re-established. The transition into the FOD suspension state is reported towards the network element management system.

Operation during the Frame Offset Discontinuity Suspension State

In principle, three requirements have to be fulfilled by the TCM Sink function block and the TCM NIM function block:

Do not extend the interruption of the signal;
Suppress all effects of the frame offset discontinuity for the fault management and performance monitoring; and
Do not use tandem connection defect condition changes for SNCP switching.

Handling of Defects

Figure 7:
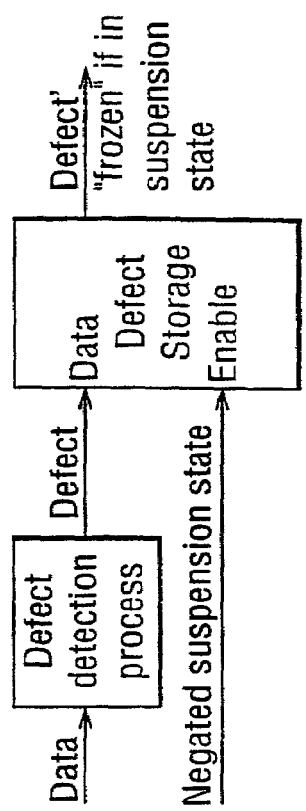
FIG. 7 shows a freeze process for TCM Sink and TCM NIM Defect Evaluation.

In order to minimize the signal interruption the defect detection processes are not affected by the frame offset discontinuity suspension state, i.e. it cannot be ruled out that defects are detected during the phase of misalignment between pointer and transported signal. However there is a modified processing of the defects and performance monitoring primitives during the frame offset discontinuity suspension state. For this purpose the state of the tandem connection defects dUNEQ, dLTC, dTIM, dDEG, dRDI, dODI, dIncAIS is frozen with the transition into the frame offset discontinuity suspension state. The frozen versions of these tandem connection defects are called dUNEQ', dLTC', dTIM', dDEG', dRDI', dODI', dincAIS' and are made available as latched copies for further processing (consequent action handling, defect correlation, performance monitoring). However this additional latching of the tandem connection defects does not suspend the tandem connection defect detection processes. The freeze of the defects is shown for example by the block diagram of FIG. 7. The defect storage becomes transparent when the FOD suspension state is inactive.

The relations below are valid in case that CI_SSF is inactive, otherwise the FOD suspension state is left. The relations are quite similar to those used in the normal operation state, however partially the frozen versions of the tandem connection defects are used in the FOD suspension state.

Detection of Bit Errors

The detection of nN_B, nON_B, nF_B, nOF_B is stopped during the frame offset discontinuity suspension phase.

Consequent Actions

The following modified consequent action handling is used during the frame offset discontinuity suspension state:

```
aAIS  <- dUNEQ or dTIM or dLTC
aTSF  <- CI_SSF or dUNEQ' or dTIM' or dLTC'
aTSD  <- dDEG'
aRDI  <- CI_SSF or dUNEQ' or dTIM' or dLTC'
aREI  <- nN_B
aODI  <- CI_SSF or dUNEQ' or dTIM' or dLTC' or dIncAIS'
aOEI  <- nON_B
aOSF  <- CI_SSF or dUNEQ or dTIM or dLTC or dIncAIS
```

Rationales:

aAIS and aOSF are used for insertion of AIS in the TC TT Sink and TC Adaptation Sink function. As the egressing signal shall not be interrupted for a fixed time but shall recover as soon as possible, the actually detected defects are used here.

aTSF and aTSD are used as switching criteria for TC NIM TT based SNCP. As there shall be no protection switches caused by incorrectly detected tandem connection defects during the frame offset discontinuity suspension state, the frozen tandem connection defects are used here.

aTSF is also used for detection of defect seconds pN_DS. Also here the frozen states of the tandem connection defects shall be used.

aRDI is used for insertion of the corresponding remote information into the reverse direction. To get a consistent view to the performance monitoring it should be identical with aTSF which is used for pN_DS, therefore also here the frozen states of the tandem connection defects are used.

aODI is used for insertion of the corresponding remote information into the reverse direction and for detection of defect seconds pON_DS. Also here the frozen states of the tandem connection defects are used.

aREI and aOEI will not indicate errors towards the remote end as the detection of bit errors is stopped during the frame offset discontinuity suspension state.

Defect Correlations

The following modified defect correlations are used during the frame offset discontinuity suspension state:

```
cUNEQ   <- MON and dUNEQ'
cLTC    <- MON and (not CI_SSF) and (not dUNEQ') and dLTC'
cTIM    <- MON and (not dUNEQ') and (not dLTC') and dTIM'
cDEG    <- MON and (not dTIM') and (not dLTC') and dDEG'
cSSF    <- MON and CI_SSF and SSF_reported
cRDI    <- MON and (not dUNEQ') and (not dTIM') and (not dLTC')
         and dRDI' and RDI_Reported
cODI    <- MON and (not dUNEQ') and (not dTIM') and (not dLTC') and
         dODI' and ODI_Reported
cIncAIS <- MON and (not CI_SSF) and (not dTIM') and (not dLTC') and
         dIncAIS' and IncAIS_Reported.
```

Rationale:

The frozen states of the tandem connection defects are used for the defect correlation. So also the reporting of the faults will be frozen during the frame offset discontinuity suspension state.

Performance Monitoring

The following modified determination of the performance monitoring primitives is used during the frame offset discontinuity suspension state.

| | |
|---|---|
| pN_DS | <- aTSF or dEQ |
| pF_DS | <- dRDI' |
| pN_EBC | <- □nN_B |
| pF_EBC | <- □nF_B |
| pON_DS | <- aODI or dEQ |
| pOF_DS | <- dODI' |
| pON_EBC | <- □nON_B |
| pOF_EBC | <- □nOF_B |

Rationales:

The accumulation of bit errors during the frame offset discontinuity suspension state is suspended as the detection of bit errors is stopped in this state.

For the detection of defect seconds the frozen states of the tandem connection defects are used, therefore also the defect second detection is frozen during this period.

The invention claimed is:

1. A method of transmitting data in a synchronous hierarchic network system comprising at least a path segment between a first network element and at least a second network element on which tandem connection monitoring method is established for monitoring transmission of information over the path segment, the method comprising:

detecting a frame offset discontinuity condition indicating frame offset discontinuities at the first network element on the basis of detection of an alteration of a pointer value other than pointer justification, wherein, during a time interval necessary for detection and signalling to the second network element of the frame offset discontinuity condition, transmitting to the second network element a last valid pointer value received in advance of the discontinuity condition, wherein, in response to detection of the frame offset discontinuity condition, at the first network element stepwise altering received pointer values for subsequent transmission.

2. The method according to claim 1, wherein a discontinuity condition is signaled to an equipment management system.

3. The method according to claim 2, wherein signaled discontinuity condition information is stored in a transmission quality report.

4. The method according to claim 1, wherein the discontinuity condition detected at the first network element is transmitted within a defined data element of a virtual container transmitted to the second network element.

5. The method according to claim 1, wherein the discontinuity condition is signaled from the second network element to an equipment management system.

6. The method according to claim 5, wherein signaled discontinuity condition information is stored in a transmission quality report.

7. The method according to claim 1, wherein stepwise alteration comprises:

a pointer value adjustment towards a new valid pointer value; and at each step, introduction of a pointer value difference which is within a standardized range of pointer increment or decrement operations.

8. The method according to claim 7, wherein the distance between a last valid pointer value before and the new valid pointer value after the detected discontinuity condition is used to evaluate and select a shortest difference for a stepwise adaptation of the pointer values.

9. The method according to claim 8 wherein, in case of similar differences for increasing or decreasing of the pointer value, the direction of pointer drift before the discontinuity condition occurred is used to determine a direction for the stepwise adaptation of the pointer values.

10. The method according to claim 1, wherein the first network element operates as a source network element and the second network element operates as a sink network element.

* * * * *